(12) United States Patent
Teh

(10) Patent No.: US 9,071,143 B2
(45) Date of Patent: Jun. 30, 2015

(54) SEMICONDUCTOR DEVICE

(71) Applicant: KABUSHIKI KAISHA TOSHIBA, Minato-ku (JP)

(72) Inventor: Chen Kong Teh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/959,935

(22) Filed: Aug. 6, 2013

(65) Prior Publication Data

US 2014/0232455 A1 Aug. 21, 2014

(30) Foreign Application Priority Data

Feb. 21, 2013 (JP) ................................. 2013-032110

(51) Int. Cl.
*G05F 1/10* (2006.01)
*G05F 3/02* (2006.01)
*H02M 3/158* (2006.01)
*H02M 1/00* (2007.01)

(52) U.S. Cl.
CPC .... *H02M 3/1588* (2013.01); *H02M 2001/0003* (2013.01); *Y02B 70/1466* (2013.01)

(58) Field of Classification Search
CPC ........... G05F 3/262; G05F 3/265; G05F 3/30; G05F 3/205; G05F 1/465; G05F 1/56; G05F 1/575; G05F 3/247; G05F 3/24; G11C 5/147
USPC .................. 327/538, 540, 541; 323/282–283
See application file for complete search history.

(56) References Cited

U.S. PATENT DOCUMENTS

| 7,900,069 | B2 * | 3/2011 | Allarey ......................... 713/320 |
| 8,063,618 | B2 * | 11/2011 | Lam et al. ..................... 323/282 |
| 8,179,106 | B2 | 5/2012 | Tokura et al. |
| 2007/0260898 | A1 * | 11/2007 | Burton et al. ................. 713/300 |
| 2008/0088290 | A1 | 4/2008 | So |
| 2009/0322409 | A1 * | 12/2009 | Levit et al. .................... 327/513 |
| 2011/0133712 | A1 * | 6/2011 | Sasaki et al. .................. 323/283 |
| 2011/0175586 | A1 * | 7/2011 | Kuo .............................. 323/282 |
| 2011/0273808 | A1 | 11/2011 | So |
| 2013/0038974 | A1 | 2/2013 | So |
| 2013/0094312 | A1 * | 4/2013 | Jang et al. ..................... 365/194 |

FOREIGN PATENT DOCUMENTS

| JP | 2008-141845 A | 6/2008 |
| JP | 2010-507356 A | 3/2010 |
| JP | 2010-088291 A | 4/2010 |
| JP | 2010-103362 A | 5/2010 |
| JP | 2011-036047 A | 2/2011 |
| JP | 2011-211887 A | 10/2011 |

* cited by examiner

*Primary Examiner* — Quan Tra
(74) *Attorney, Agent, or Firm* — White & Case LLP

(57) ABSTRACT

A semiconductor device includes a first semiconductor chip which includes a first power supply terminal and into which a circuit block which is operated by a power supply voltage supplied to the first power supply terminal is integrated, a power circuit that includes switching transistors and supplies the power supply voltage to the first power supply terminal, and a DCDC control unit that is formed on the first semiconductor chip and generates a control signal for controlling the turning on and off of the switching transistors in response to an information signal from the circuit block and a voltage information signal corresponding to an output voltage from the power circuit.

9 Claims, 16 Drawing Sheets

US 9,071,143 B2

SEMICONDUCTOR DEVICE

CROSS-REFERENCE TO RELATED APPLICATIONS

This application is based upon and claims the benefit of priority from Japanese Patent Application No. 2013-32110, filed on Feb. 21, 2013; the entire contents of which are incorporated herein by reference.

FIELD

Embodiments described herein relate generally to semiconductor devices including a power circuit and a semiconductor chip which is driven by an output voltage from the power circuit.

BACKGROUND

A method has been known in which an integrated circuit called an SoC (System on Chip) is designed by integrating a series of necessary functional system into one semiconductor chip. Since various functions are integrated into one semiconductor chip, a high-performance semiconductor device is provided. However, a load current is changed by the functions performed on the semiconductor chip, which results in a variation in power supply voltage. In recent years, a technique has been proposed which selectively supplies a plurality of power supply voltages generated by a DCDC converter according to the operation state of each functional block in a semiconductor device including a semiconductor chip into which various functional blocks are integrated.

When the power supply voltage varies, the operation speed of the circuit of the functional block on the semiconductor chip also varies. As the power supply voltage increases, the operation speed of the circuit increases. As the power supply voltage is reduced, the operation speed of the circuit is reduced. When the power supply voltage is reduced to below a predetermined threshold voltage, the operation of the circuit of the functional block is likely to be disabled. In addition, when the manufacturing conditions of each semiconductor chip vary, the operation speed of the circuit of the functional block formed in the semiconductor chip varies. In some cases, EMI (Electro Magnetic Interference) occurs due to noise from a power circuit, depending on the relationship between the switching frequency of the power circuit which supplies the power supply voltage and the operating frequency of the functional block on the semiconductor chip. Therefore, there is a demand for a power supply system capable of supplying an appropriate power supply voltage to a semiconductor chip according to various environments.

DETAILED DESCRIPTION

In general, according to one embodiment, a semiconductor device includes a first semiconductor chip which includes a first power supply terminal and into which a circuit block that is operated by a power supply voltage supplied to the first power supply terminal is integrated, a power circuit that includes a switching transistor and supplies the power supply voltage to the first power supply terminal, and a control circuit that is formed on the first semiconductor chip and generates a control signal for controlling the turning on and off of the switching transistor in response to an information signal from the circuit block and a voltage information signal corresponding to an output voltage from the power circuit.

Exemplary embodiments of semiconductor device will be explained below in detail with reference to the accompanying drawings. The present invention is not limited to the following embodiments.

Figure 1:
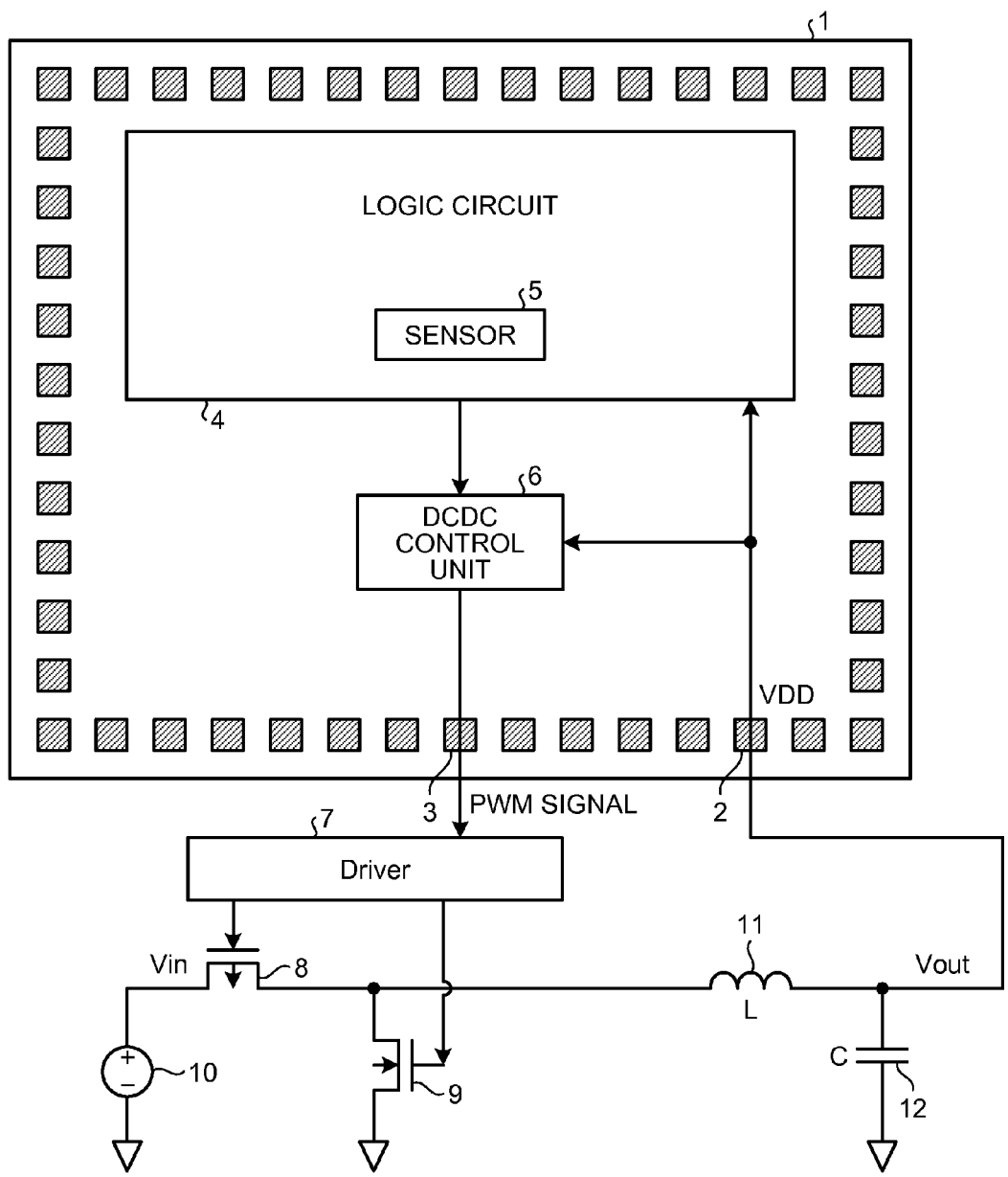
FIG. 1 is a diagram illustrating a semiconductor device according to a first embodiment.

FIG. 1 is a diagram illustrating the structure of a semiconductor device according to a first embodiment. A logic circuit 4 with a predetermined function is formed in a semiconductor chip 1. The logic circuit 4 includes a sensor 5. The sensor 5 detects various kinds of information about the logic circuit 4. For example, the sensor 5 detects information, such as an operating voltage, an operating current, and the temperature. The information of the sensor 5 is supplied to a DCDC control unit 6. The semiconductor chip 1 includes a plurality of electrode pads. A power circuit applies an output voltage Vout as a power supply voltage VDD for the semiconductor chip 1 to an electrode pad 2. A signal corresponding to the power supply voltage VDD is supplied to the DCDC control unit 6. The DCDC control unit 6 supplies, to an electrode pad 3, a pulse width control signal (hereinafter, referred to as a PWM signal) for controlling the operation of the power circuit such that the power supply voltage VDD becomes a desired voltage, in response to the signal from the sensor 5 and the signal corresponding to the power supply voltage VDD.

The power circuit includes a driver 7 which responds to the PWM signal supplied to the electrode pad 3. The driver 7 controls the ratio (Duty) of the turning on and off of a first PMOS switching transistor 8 and a second NMOS switching transistor 9 in response to the PWM signal. The driver 7 includes, for example, a plurality of stages of CMOS inverters (not illustrated). When the first PMOS switching transistor 8 is turned on, the second NMOS switching transistor 9 is turned off. Then, a current is supplied from the DC power supply 10 to a capacitor 12 through the first PMOS switching transistor 8 and an inductor 11 and an output voltage Vout increases. On the other hand, when the first PMOS switching transistor 8 is turned off, the second NMOS switching transistor 9 is turned on. Then, charge stored in the capacitor 12 is discharged through the second NMOS switching transistor 9 and the output voltage Vout is reduced. The duty of the turning on and off of the first PMOS switching transistor 8 and the second NMOS switching transistor 9 can be adjusted to obtain a desired output voltage Vout.

According to this embodiment, signals indicating various kinds of information are directly supplied from the sensor 5 of the logic circuit 4 to the DCDC control unit 6 which is formed in the semiconductor chip 1 having the logic circuit 4 formed therein. Therefore, it is possible to control the output voltage Vout from the power circuit on the basis of various kinds of information from the sensor 5, without any delay, and response to the operation state of the logic circuit 4 is improved. In addition, since the DCDC control unit 6 is formed in the semiconductor chip 1, it is possible to supply various kinds of information to the DCDC control unit 6 using lines (not illustrated) formed in the semiconductor chip 1, without increasing the number of electrode pads in the semiconductor chip 1.

Figure 2:
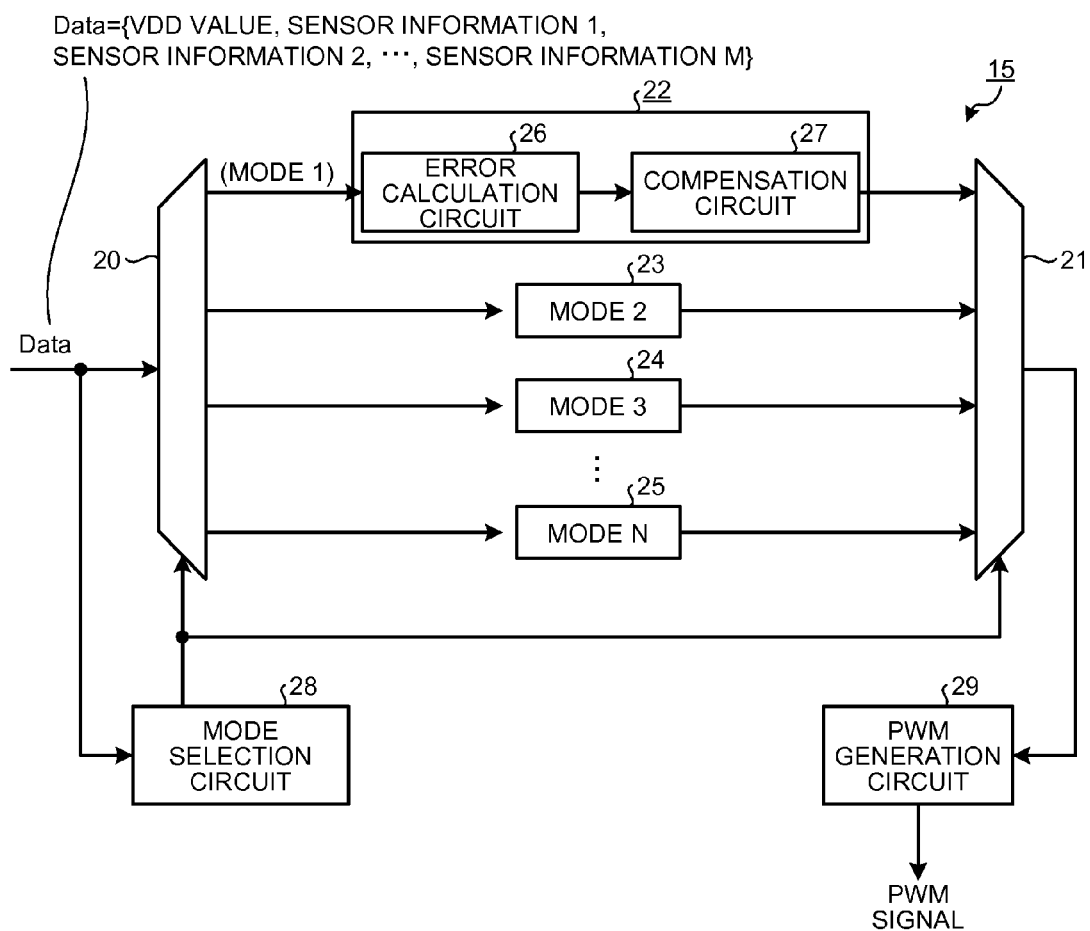
FIG. 2 is a diagram illustrating a DCDC control unit according to a second embodiment.

FIG. 2 is a conceptual diagram illustrating a DCDC control unit according to a second embodiment. A DCDC control unit 15 according to this embodiment includes a plurality of circuit structures corresponding to a plurality of control modes. For example, when mode 1 is selected, a structure 22 of the DCDC control unit 15 having an error calculation circuit 26 and a compensation circuit 27 as components is selected. The mode is selected by multiplexers 20 and 21 which respond to selection signals from a mode selection circuit 28. Modes 1 to N are appropriately selected depending on information (Data) supplied from the logic circuit 4. Different circuit structures 22 to 25 of the DCDC control unit 15 are selected depending on each mode. Signals which are processed by different circuit structures are supplied to a PWM generation circuit 29 through the multiplexer 21. The PWM generation circuit 29 outputs a PWM signal for controlling the duty of the turning on and off of a switching transistor (not illustrated) of a power circuit.

Figure 3:
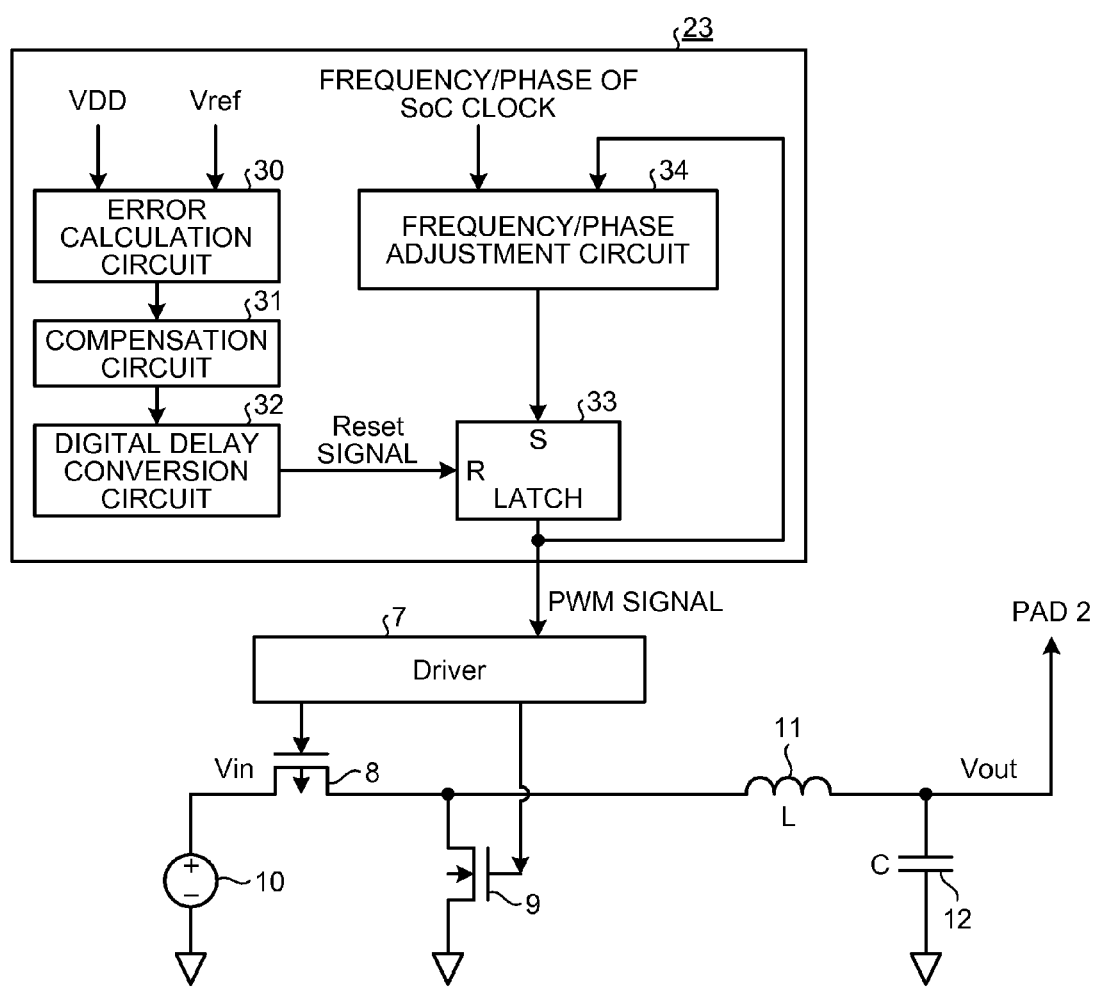
FIG. 3 is a diagram illustrating a DCDC control unit according to a third embodiment.

FIG. 3 is a diagram illustrating a DCDC control unit and a power circuit according to a third embodiment. In the third embodiment, the same components as those in the first and second embodiments are denoted by the same reference numerals and the description thereof will not be repeated. This embodiment relates to a structure for avoiding the power noise interference of a semiconductor device. For example, a circuit structure 23 when mode 2 is selected in the embodiment illustrated in FIG. 2 is configured. In this embodiment, the circuit structure 23 of the DCDC control unit includes an error calculation circuit 30 that compares a power supply voltage VDD with a predetermined reference voltage Vref and outputs an error signal on the basis of the comparison result. The output from the error calculation circuit 30 is supplied to a compensation circuit 31. The compensation circuit 31 can perform, for example, PID (Proportional Integral Derivative) control such that the error between the power supply voltage VDD and the reference voltage Vref is close to zero (0). The output from the compensation circuit 31 is supplied to a digital delay conversion circuit 32. The digital delay conversion circuit 32 converts the output signal from the compensation circuit 31 into a digital value associated with the amount of delay. The output from the digital delay conversion circuit 32 is supplied to a reset signal input terminal R of an RS latch circuit 33. The reset signal of the RS latch circuit 33 controls the falling of a PWM signal.

An SoC clock signal indicating the operating frequency and phase of a predetermined logic circuit (not illustrated) formed in the semiconductor chip is supplied to one input terminal of a frequency/phase adjustment circuit 34. The PWM signal, which is the output from the RS latch circuit 33, is supplied to the other input terminal of the frequency/phase adjustment circuit 34. The frequency/phase adjustment circuit 34 compares the frequencies and phases of the SoC clock signal and the PWM signal. The frequency/phase adjustment circuit 34 supplies a control signal whose rising time has been changed depending on the comparison result between the SoC clock signal and the PWM signal to a set input terminal of the RS latch circuit 33 and adjusts the frequencies and phases such that the frequency and phase of the SoC clock signal are different from those of the PWM signal. The rising of the PWM signal, which is the output signal from the RS latch circuit 33, is controlled by the signal supplied to the set signal input terminal S to control the frequency and phase of the PWM signal. The falling of the PWM signal is controlled by the output from the digital delay conversion circuit 32 and the duty of the turning on and off of the switching transistor of the power circuit is controlled.

The PWM signal whose rising and falling have been controlled is supplied from the RS latch circuit 33 to a driver 7. The turning on and off of the first PMOS switching transistor 8 and the second NMOS switching transistor 9 are controlled by the output from the driver 7 to which the PWM signal is supplied. The rising of the PWM signal is controlled to control the switching frequency of the power circuit to the frequency and phase different from those of the SoC clock signal. Therefore, it is possible to avoid EMI due to power supply noise which is generated when the frequency and phase of the SoC clock signal, which are the operating frequency of the logic circuit (not illustrated) operating in the semiconductor chip, are equal to the switching frequency and phase of the power circuit.

Figure 4:
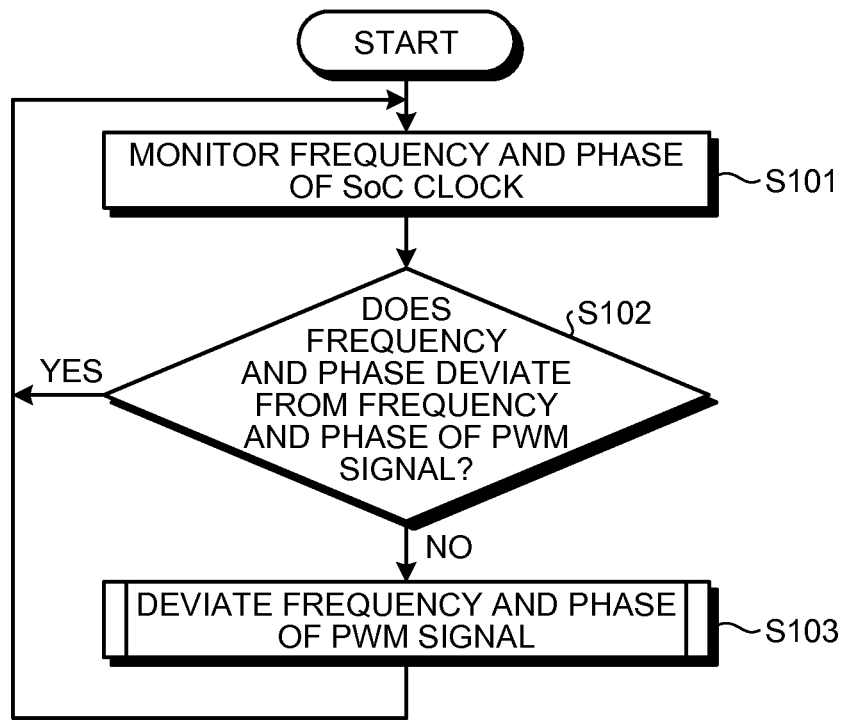
FIG. 4 is a diagram illustrating the operation of the DCDC control unit according to the third embodiment.

FIG. 4 is a diagram illustrating the control flow of the circuit structure 23 of the DCDC control unit illustrated in FIG. 3. The frequency and phase of the SoC clock signal, which are the operating frequency of a predetermined logic circuit (not illustrated) formed in the semiconductor chip, are monitored (S101). The frequency and phase are compared with the PWM signal for controlling the frequency and phase of the power circuit and it is determined whether the frequency and phase deviate from the frequency and phase of the power circuit (S102). When they deviate from each other, the monitoring operation is continuously performed. When they are identical to each other, control is performed such that they deviate from each other (S103). When the frequency and phase of the power circuit deviate from the operating frequency and phase of the SoC clock signal, it is possible to avoid EMI due to power supply noise. However, a multiplier circuit (not illustrated) which multiplies the frequency of the PWM signal may be provided in the frequency/phase adjustment circuit 34 and control may be performed such that the harmonic signal component of the PWM signal is not identical to the operating frequency and phase of the SoC clock signal.

Figure 5:
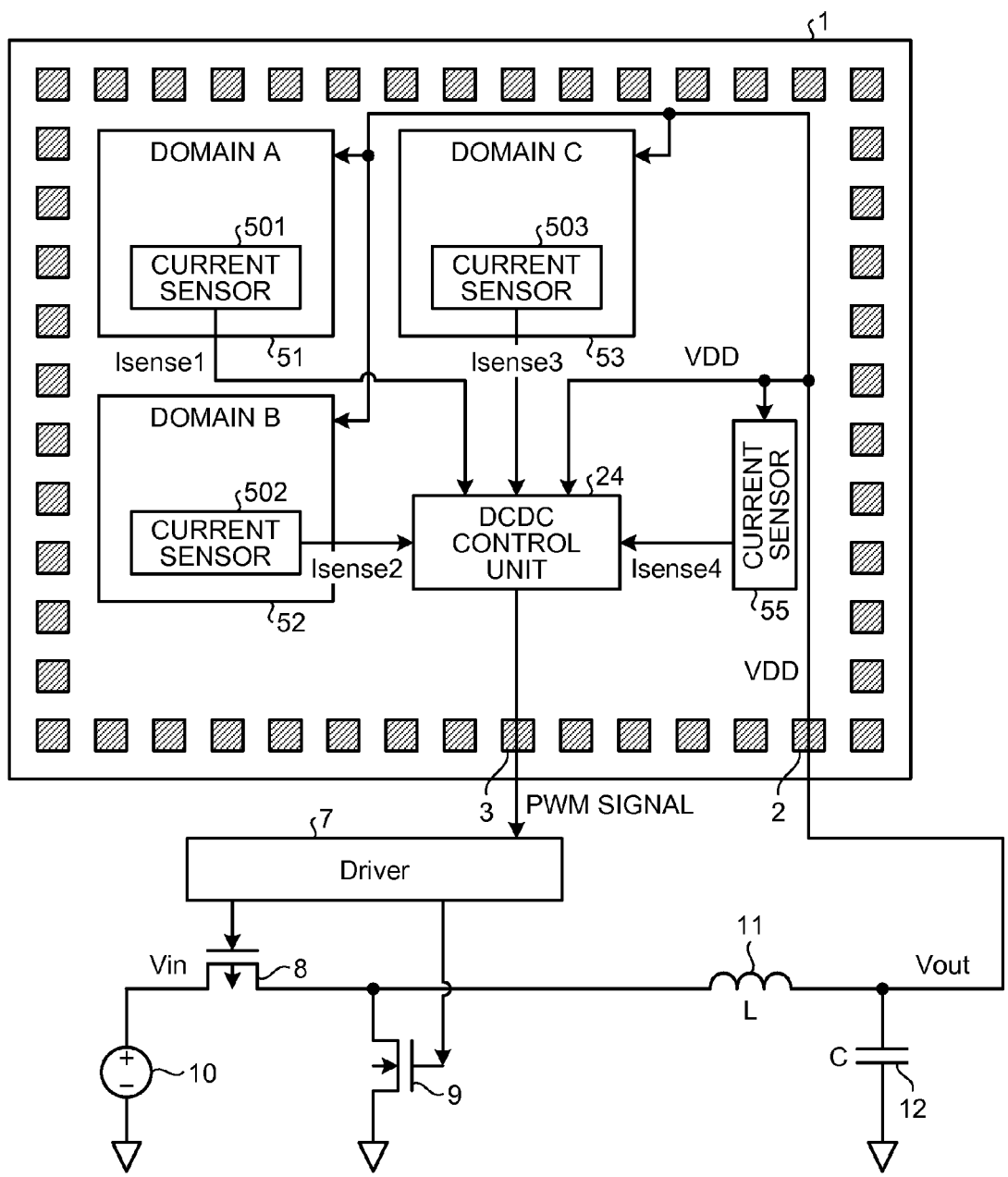
FIG. 5 is a diagram illustrating a semiconductor device according to a fourth embodiment.

FIG. 5 is a diagram illustrating a semiconductor device according to a fourth embodiment. In the fourth embodiment, the same components as those in the first to third embodiments are denoted by the same reference numerals and the description thereof will not be repeated. This embodiment relates to a structure for preventing a rush current when a power supply voltage rises. A plurality of power domains 51 to 53 is formed in a semiconductor chip 1. Circuit block regions in which one power supply voltage is applied and which perform predetermined functions are represented by the power domains 51 to 53. The power domains 51 to 53 form, for example, a CPU (Central Processing Unit), a DSP (Digital Signal Processor), or a predetermined logic circuit. The power domains 51 to 53 include current sensors 501 to 503 which detect the operating currents of the power domains 51 to 53, respectively. Each of the current sensors 501 to 503 can be configured such that it detects the voltage generated between both ends of a resistor connected to, for example, a power line (not illustrated) using a differential amplifier circuit (not illustrated), or it can be formed by a current mirror circuit (not illustrated). The sensing signals Isense1 to Isense3 from the current sensors 501 to 503 are supplied to a DCDC control unit 24. The sensing signal Isense4 from a current sensor 55 which detects the current of the power supply voltage VDD is also supplied to the DCDC control unit 24.

Figure 6:
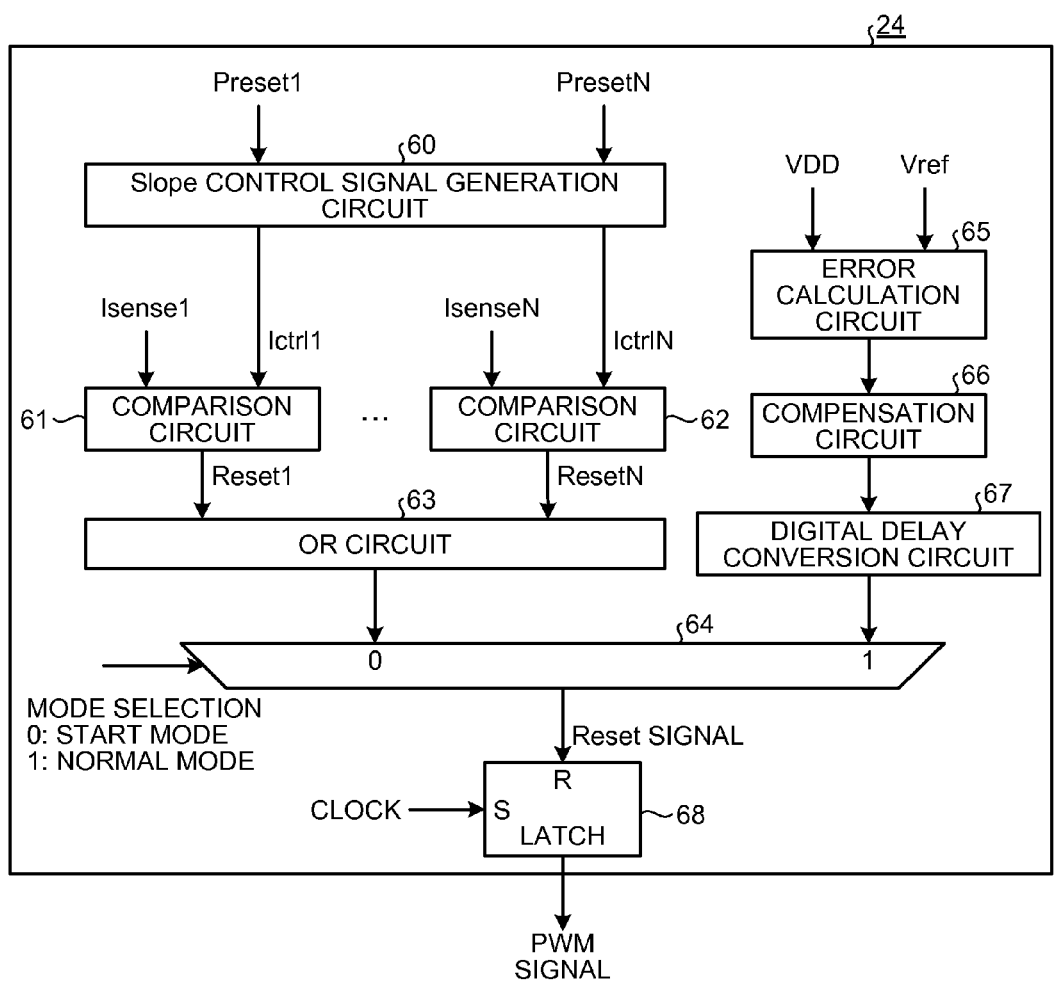
FIG. 6 is a diagram illustrating an example of a DCDC control unit used in the semiconductor device according to the fourth embodiment.

FIG. 6 is a diagram illustrating an example of the circuit structure of the DCDC control unit 24 which is used in the semiconductor device according to the fourth embodiment illustrated in FIG. 5. For example, the DCDC control unit 24 according to this embodiment is configured as the circuit structure 24 when mode 3 is selected in the embodiment illustrated in FIG. 2. The DCDC control unit 24 according to this embodiment includes a Slope control signal generation circuit 60 that generates a ramp signal with a predetermined slope according to predetermined current setting signals Preset1 to PresetN which are set so as to correspond to each power domain. Current control output signals Ictrl1 to IctrlN with predetermined slopes are output from the Slope control signal generation circuit 60 and are then supplied to comparison circuits 61 to 62. The comparison circuits 61 to 62 compare the current control output signals Ictrl1 to IctrlN with the sensing signals Isense1 to IsenseN from the current sensors 501 to 503 in the power domains 51 to 53 which are formed in the semiconductor chip 1.

When the comparison results of the comparison circuits 61 to 62 show that, when the sensing signals Isense1 to IsenseN detected from the power domains are more than the current control output signals Ictrl1 to IctrlN, reset signals Reset1 to ResetN are output from the comparison circuits 61 to 62 and are then supplied to an OR circuit 63. The output from the OR circuit 63 is supplied to a mode selection circuit 64. The DCDC control unit 24 according to this embodiment includes an error calculation circuit 65 that compares the power supply voltage VDD with a predetermined reference voltage Vref and calculates the error therebetween. The output from the error calculation circuit 65 is supplied to a compensation circuit 66 which performs PID control. The compensation circuit 66 performs the PID control such that the error between the power supply voltage VDD and the reference voltage Vref is close to zero (0). The output from the compensation circuit 66 is supplied to a digital delay conversion circuit 67. The digital delay conversion circuit 67 converts the output signal from the compensation circuit 66 to a digital value associated with the amount of delay. The output from the digital delay conversion circuit 67 is supplied to the mode selection circuit 64.

When the mode selection circuit 64 selects the start mode, control based on the current control output signals Ictrl1 to IctrlN whose slopes are set on the basis of predetermined current setting signals Preset1 to PresetN is selected and the output signal from the OR circuit 63 is supplied to a reset input terminal R of an RS latch circuit 68. When the normal mode is selected, a signal based on control which makes the power supply voltage VDD equal to the predetermined reference voltage Vref is supplied from the mode selection circuit 64 to the reset input terminal R of the RS latch circuit 68. The PWM signal whose rising is controlled by a clock signal (clock) supplied to a set input terminal S of the RS latch circuit 68 and whose falling is controlled by the clock signal from the mode selection circuit 64 is output from the RS latch circuit 68.

According to this embodiment, the current when the power supply voltage rises in each power domain can be controlled to a predetermined slope. Therefore, it is possible to suppress a rush current when the power supply voltage rises.

Figure 7:
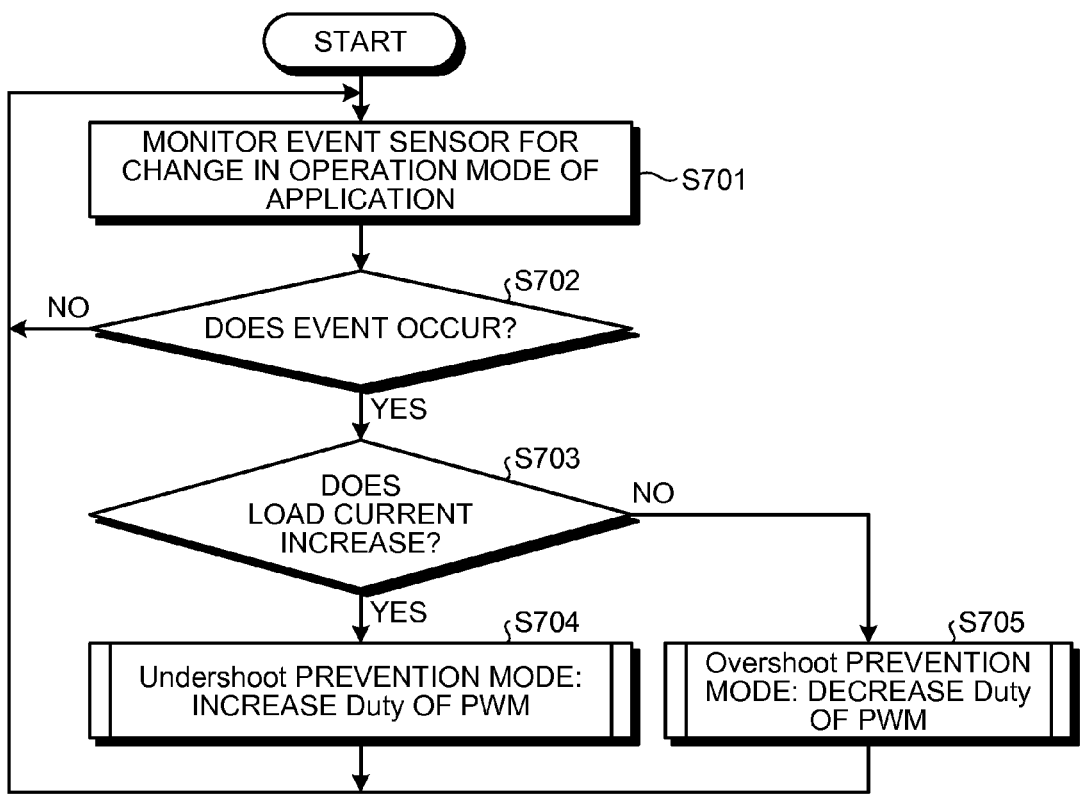
FIG. 7 is a diagram illustrating the operation of a DCDC control unit according to a fifth embodiment.

FIG. 7 is a diagram illustrating the operation of a DCDC control unit according to a fifth embodiment. In this embodiment, each power domain (not illustrated) formed in a semiconductor chip includes a sensor (not illustrated) which detects a change in the operation mode of each power domain. Each sensor detects information about a change in the operation mode of each power domain and supplies the information to the DCDC control unit (not illustrated). The information about the change in the operation mode is, for example, information indicating a change in an application executed by each power domain and indicates information about a change from an image processing application to a simple logical operation mode. Since the load current of the power domain is changed depending on a change in the operation mode, the operating voltage of each power domain is changed. The information about the change in the operation mode is supplied to the DCDC control unit and feedforward control is performed to improve a load response speed. For example, a mode selection signal (not illustrated) which is supplied to each power domain in order to change the operation mode may be detected as the information about the change in the operation mode.

A control step is performed as follows. First, the information about the change in the operation mode, such as information indicating a change in the application executed by each power domain, is monitored (S701). Then, it is detected whether a change (event) in the operation mode occurs (S702). When the change in the operation mode does not occur, the monitoring operation is continuously performed. When the change in the operation mode occurs, it is determined that the operation mode is changed to a mode in which the load current increases (S703). When the operation mode is changed to the mode in which the load current increases, the duty of the turning on and off of a switching transistor (not illustrated) in a power circuit is adjusted and control is performed to increase an output voltage (S704). On the other hand, when the operation mode is changed to a mode in which the load current is reduced, the duty of the turning on and off of the switching transistor (not illustrated) in the power circuit is adjusted and control is performed to reduce the output voltage (S705). The feedforward control makes it possible to improve a load response. For example, a delay signal corresponding to each mode change is prepared in advance, the amount of delay of a digital delay conversion circuit (corresponding to, for example, reference numeral 67 in FIG. 6) is controlled on the basis of the occurrence of a mode change event, and the duty of the turning on and off of the switching transistor (not illustrated) of the power circuit is controlled to adjust the output voltage from the power circuit.

Figure 8:
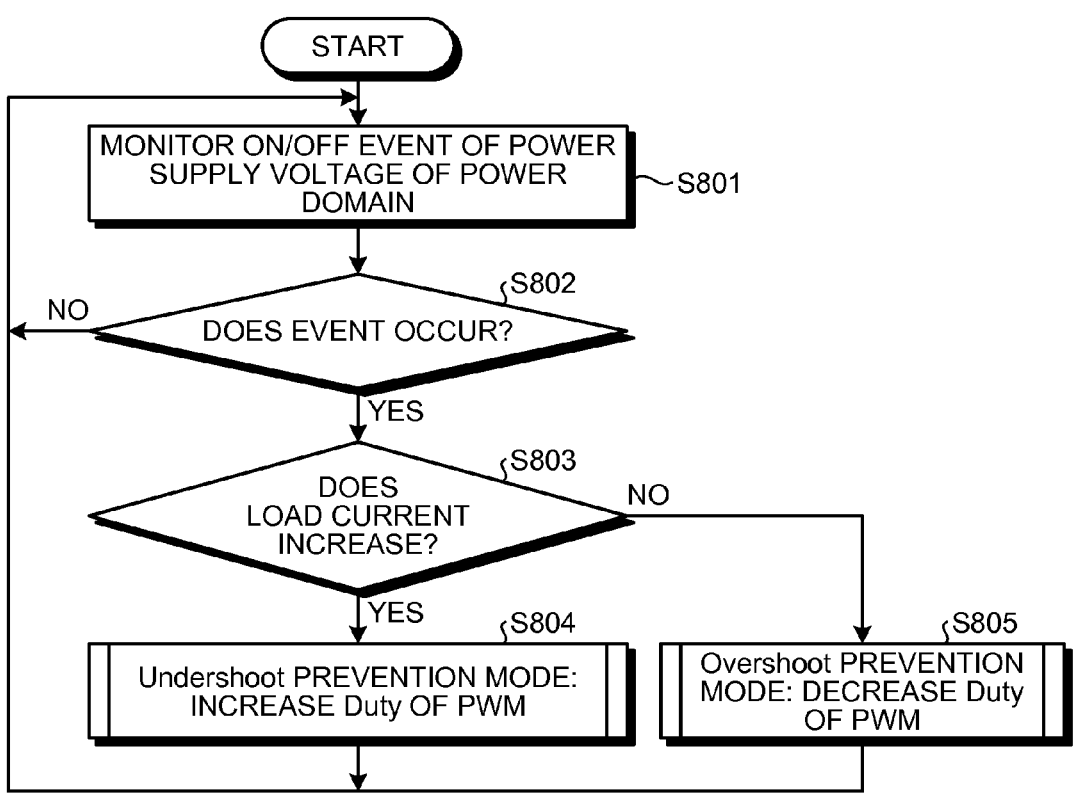
FIG. 8 is a diagram illustrating the operation of a DCDC control unit according to a sixth embodiment.

FIG. 8 is a diagram illustrating the operation of a DCDC control unit according to a sixth embodiment. In this embodiment, each power domain (not illustrated) formed in a semiconductor chip includes a sensor (not illustrated) which senses information about the turning on and off of the power supply voltage of each power domain. That is, information indicating whether each power domain operates is directly supplied to the DCDC control unit (not illustrated) formed in a semiconductor chip. As the number of power domains which operate increases, a load current increases. It is possible to improve a load response by supplying the information about the turning on and off of the power domain to the DCDC control unit and performing feedforward control. For example, an enable signal (not illustrated) which is supplied in order to control the turning on and off of the power domain may be detected as the information indicating whether each power domain operates.

A control step is performed as follows. First, information about the switching between the turning on and off of the power supply voltage of each power domain is monitored (S801). Then, it is detected whether the switching (event) between the turning on and off of the power supply voltage of each power domain occurs (S802). When the switching between the turning on and off of the power supply voltage of each power domain does not occur, the monitoring operation is continuously performed. When the switching between the turning on and off of the power supply voltage of each power domain occurs, it is determined whether a load current is increased by the switching (S803). As the number of power domains in which the power supply voltage is turned on increases, the load current increases. As the number of power domains in which the power supply voltage is turned off increases, the load current is reduced. When the load current is increased, control is performed such that the duty of the turning on and off of a switching transistor (not illustrated) in a power circuit is adjusted to increase the output voltage (S804). On the other hand, when the load current is reduced, control is performed such that the duty of the turning on and off of the switching transistor (not illustrated) in the power circuit is adjusted to reduce the output voltage (S805). The feedforward control makes it possible to improve a load response. For example, a delay signal corresponding to the turning on and off of each power domain is prepared in advance, the amount of delay of a digital delay conversion circuit (corresponding to, for example, reference numeral 67 in FIG. 6) is controlled on the basis of the occurrence of the switching between the turning on and off of the power supply voltage, and the duty of the turning on and off of the switching transistor (not illustrated) in the power circuit is controlled to adjust the output voltage from the power circuit.

Figure 9:
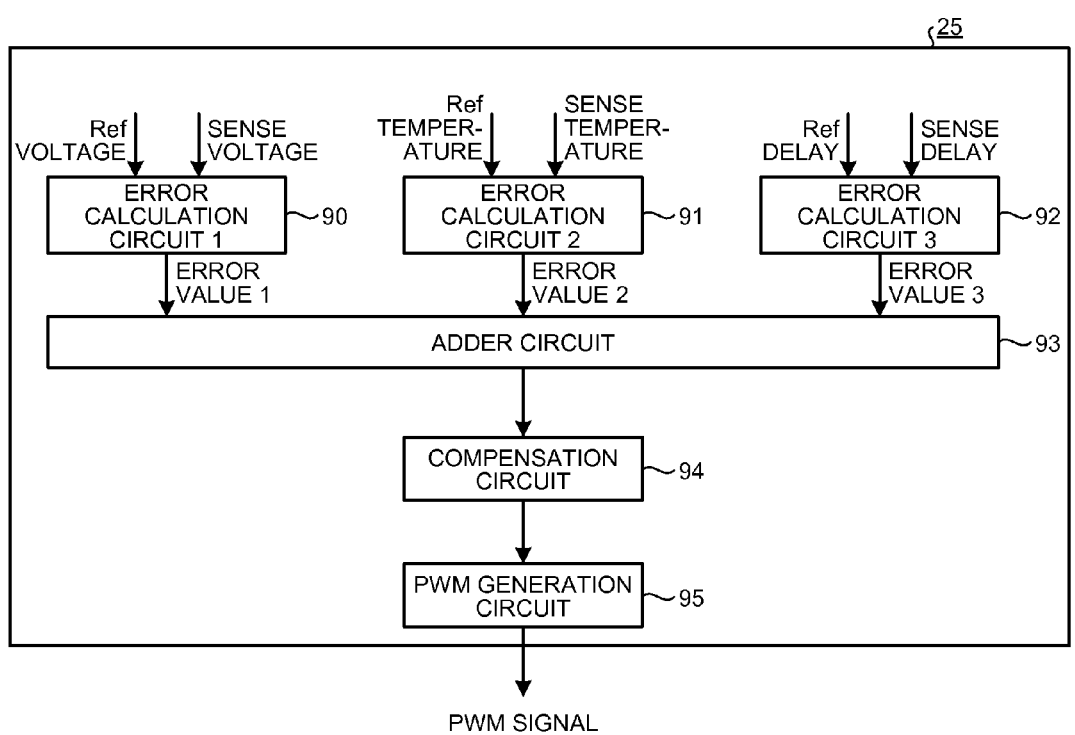
FIG. 9 is a diagram illustrating a DCDC control unit according to a seventh embodiment.

FIG. 9 is a diagram illustrating a DCDC control unit according to a seventh embodiment. For example, a DCDC control unit 25 according to this embodiment is configured as the circuit structure 25 when mode N is selected in the embodiment illustrated in FIG. 2. The DCDC control unit 25 according to this embodiment includes an error calculation circuit 90 which compares a predetermined reference voltage Ref voltage with a sense voltage indicating a power supply voltage VDD and calculates error signal error value 1 corresponding to the difference between these voltages. A second error calculation circuit 91 compares a predetermined reference temperature signal Ref temperature with a sense temperature indicating the temperature of a power domain (not illustrated) and calculates error signal error value 2 corresponding to the difference between these temperatures. Since the operation speed of the power domain formed in a semiconductor chip is changed depending on the temperature, temperature information is an index indicating the operation state of each power domain formed in the semiconductor chip. For example, since a band gap voltage is changed in proportion to the temperature, it is possible to detect the temperature information by detecting the band gap voltage of the power domain formed in the semiconductor chip.

A third error calculation circuit 92 compares a predetermined reference delay signal Ref delay with a sense delay indicating the delay of the operation speed of the power domain and calculates error signal error value 3 corresponding to the difference between these delays. For example, a plurality of inverters is formed in the power domain and the number of inverters which respond within a predetermined period of time is counted to detect the amount of delay of the operation speed of the power domain. Error signal error values 1 to 3 of the error calculation circuits 90 to 92 are supplied to an adder circuit 93 and are then added. The output from the adder circuit 93 is supplied to a compensation circuit 94 and PID control is performed. A PWM signal for controlling the duty of the turning on and off of a switching transistor (not illustrated) in a power circuit (not illustrated) such that the sum of the error signals is zero (0) on the basis of the output signal from the adder circuit 94 is output from a PWM generation circuit 95 by the PID control.

As the temperature increases, the operation speed of the power domain increases. In addition, as the power supply voltage VDD increases, the operation speed of the power domain increases. Therefore, the temperature and operation speed of the power domain can be associated with the power supply voltage VDD. Information about the temperature of the power domain formed in the semiconductor chip and information about the operation speed of the power domain are detected. Then, the information items are directly supplied to the DCDC control circuit formed on the semiconductor chip in which the power domains are formed and the power supply voltage VDD is controlled on the basis of the information items. In this way, it is possible to rapidly control the power supply voltage VDD according to a variation in the operation characteristics of the power domain which occurs in each semiconductor chip.

Figure 10:
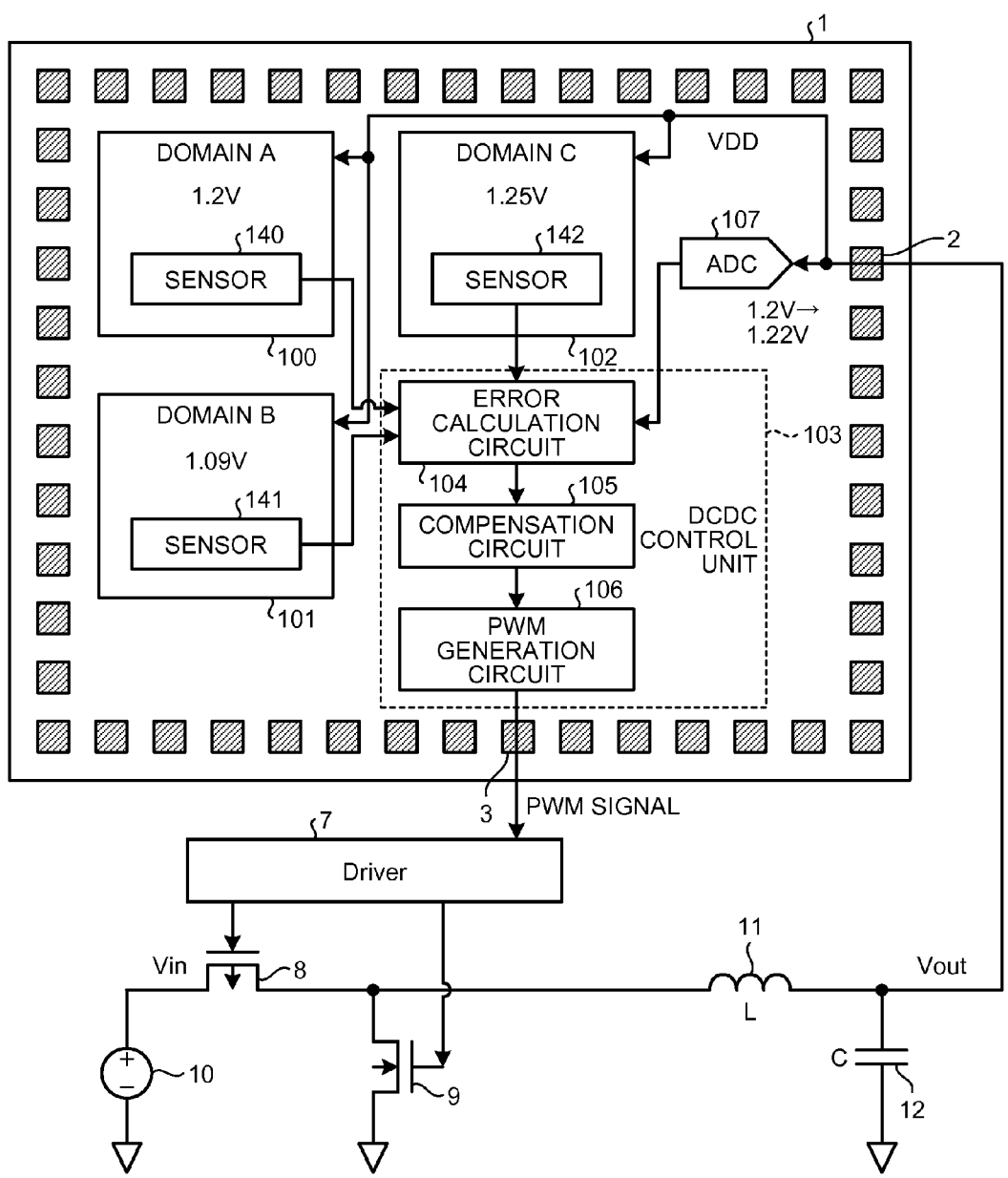
FIG. 10 is a diagram illustrating the structure of a semiconductor device according to an eighth embodiment.

FIG. 10 is a diagram illustrating the structure of a semiconductor device according to an eighth embodiment. The same components as those in the first to seventh embodiments are denoted by the same reference numerals and the description thereof will not be repeated. In this embodiment, the operating voltage of each power domain formed in a semiconductor chip 1 is monitored, the power domain in which a reduction in the operating voltage is the maximum is specified, and control is performed to increase a power supply voltage VDD such that the margin of the operating voltage can be ensured. In this way, the process is performed in order to avoid the generation of a disabled power domain due to a low power supply voltage VDD. The operating voltage means the power supply voltage of each power domain and is used for distinction from the voltage which is supplied from a power circuit to the semiconductor chip 1 for convenience of explanation, which holds for the following embodiments.

In this embodiment, power domains 100 to 102 include sensors 140 to 142, respectively. A signal from each sensor is supplied to an error calculation circuit 104 of a DCDC control unit 103 formed in the semiconductor chip 1. In addition, an AD converter 107 converts information about the power supply voltage VDD into a digital value and the digital value is supplied to the error calculation circuit 104. For example, the power domain 100 operates at an operating voltage of 1.2 V. Similarly, it is assumed that the power domain 101 operates at 1.09 V and the power domain 102 operates at 1.25 V.

When the operating voltage is reduced, delay in the operation of the power domain increases. When the operating voltage is equal to or less than a predetermined threshold value, it is difficult for the power domain to operate. Therefore, in this embodiment, when there is a power domain which operates at an operating voltage close to the threshold value, control is performed such that an output voltage Vout from the power circuit is increased to increase the power supply voltage VDD, thereby preventing the operation of the power domain in the semiconductor chip 1 from being disabled. For example, when the threshold value of the operating voltage is 1.05 V, it is detected that the operating voltage of the power domain 101, that is, 1.09 V is close to the threshold value and an operation of increasing the power supply voltage VDD from 1.2 V to 1.22 V is performed. Control is performed such that a reference voltage Vref supplied to the error calculation circuit 104 of the DCDC control unit 103 is increased to 1.22 V to increase the output voltage Vout from the power circuit, thereby increasing the power supply voltage VDD to 1.22 V. The output signal from the error calculation circuit 104 is supplied to a compensation circuit 105. The compensation circuit 105 performs PID control and the PWM generation circuit 106 supplies a PWM signal for increasing the ratio of the turning-on of a switching transistor 8 in the power circuit to increase the output voltage Vout from the power circuit to a driver 7.

According to this embodiment, the output voltage Vout from the power circuit is controlled such that the operating voltage of each power domain is not equal to or less than a predetermined threshold value. Therefore, it is possible to prevent the operation of the power domain in the semiconductor chip 1 from being disabled due to a reduction in the power supply voltage VDD.

Figure 11:
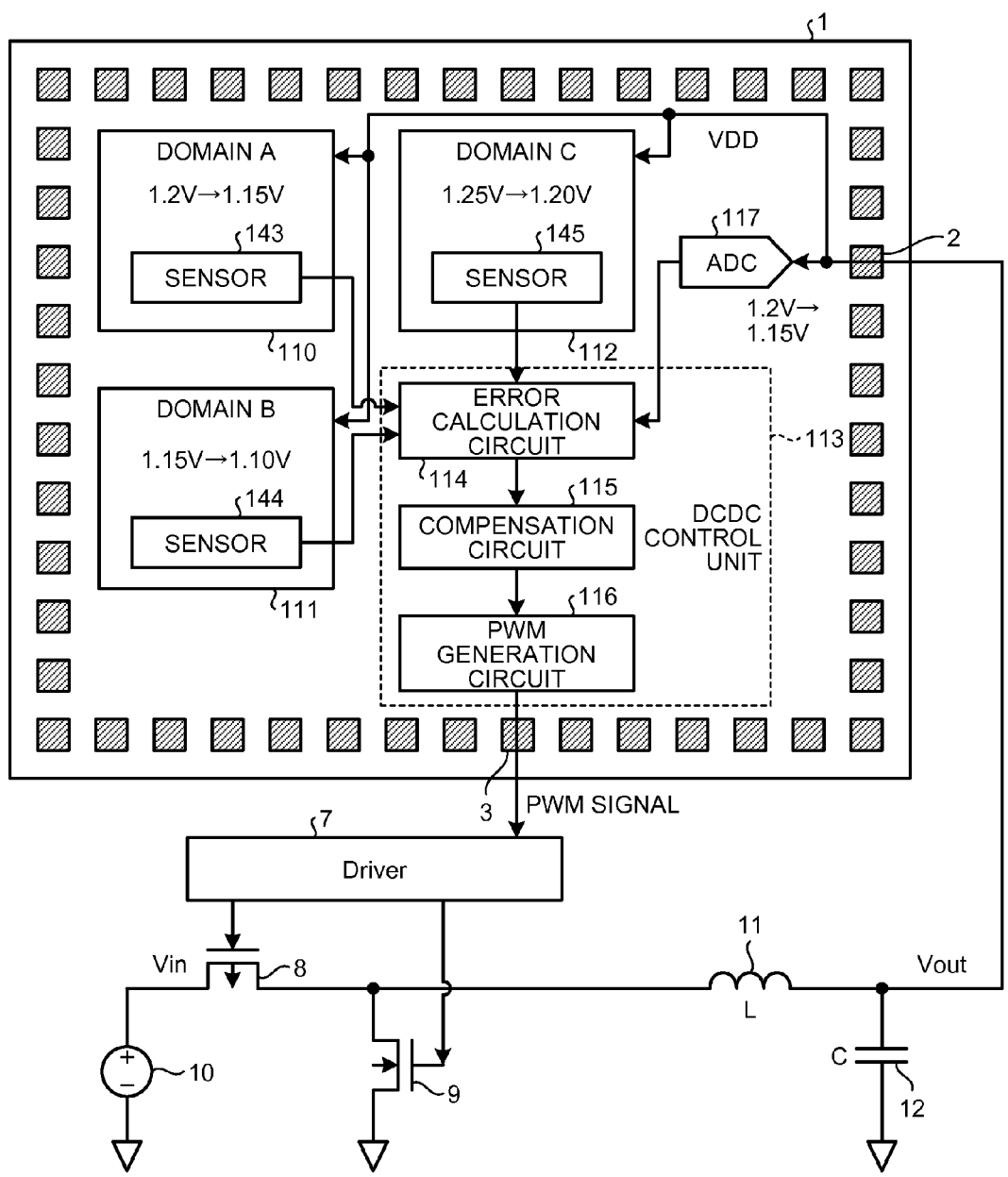
FIG. 11 is a diagram illustrating the structure of a semiconductor device according to a ninth embodiment.

FIG. 11 is a diagram illustrating the structure of a semiconductor device according to a ninth embodiment. The same components as those in the first to eighth embodiments are denoted by the same reference numerals and the description thereof will not be repeated. This embodiment relates to a structure which reduces a power supply voltage VDD to the minimum value to reduce power consumption. Sensors 143 to 145 which are respectively provided in power domains 110 to 112 directly supply information about the operating voltage of each power domain to an error calculation circuit 114 of a DCDC control unit 113 which is formed in a semiconductor chip 1 having the power domains 110 to 112 formed therein. A signal, which is a digital value converted by an AD converter 117, is supplied to the error calculation circuit 114.

When the operating voltage of each power domain in the semiconductor chip 1 has a sufficient margin with respect to a predetermined threshold voltage, control is performed to reduce the power supply voltage VDD. For example, it is assumed that, when the threshold value of the operating voltage of each of the power domains 110 to 112 formed in the semiconductor chip 1 is 1.09 V, the power domain 111 has the lowest operating voltage of 1.15 V in the voltage information obtained from the power domains 110 to 112 in the semiconductor chip 1. In this case, the operating voltage of each of the power domains 110 to 112 formed in the semiconductor chip 1 has a sufficient margin and control is performed to reduce the power supply voltage VDD from, for example, 1.2 V to 1.15 V. It is possible to perform control such that the power supply voltage VDD is reduced to 1.15 V by setting the reference voltage Vref supplied to the error calculation circuit 114 of the DCDC control unit 113 to 1.15 V. The output signal from the error calculation circuit 114 is supplied to a compensation circuit 115. The compensation circuit 115 performs PID control and a PWM generation circuit 116 supplies a PWM signal for decreasing the ratio of the turning-on of a switching transistor 8 in a power circuit to reduce the output voltage Vout from the power circuit to a driver 7.

According to this embodiment, information indicating the state of the operating voltage of each power domain is directly supplied to the DCDC control unit which is formed in the semiconductor chip 1 having the power domains formed therein. Therefore, when there is a margin in the operating voltage of each power domain, control can be performed such that the power supply voltage VDD is rapidly decreased to reduce power consumption.

Figure 12:
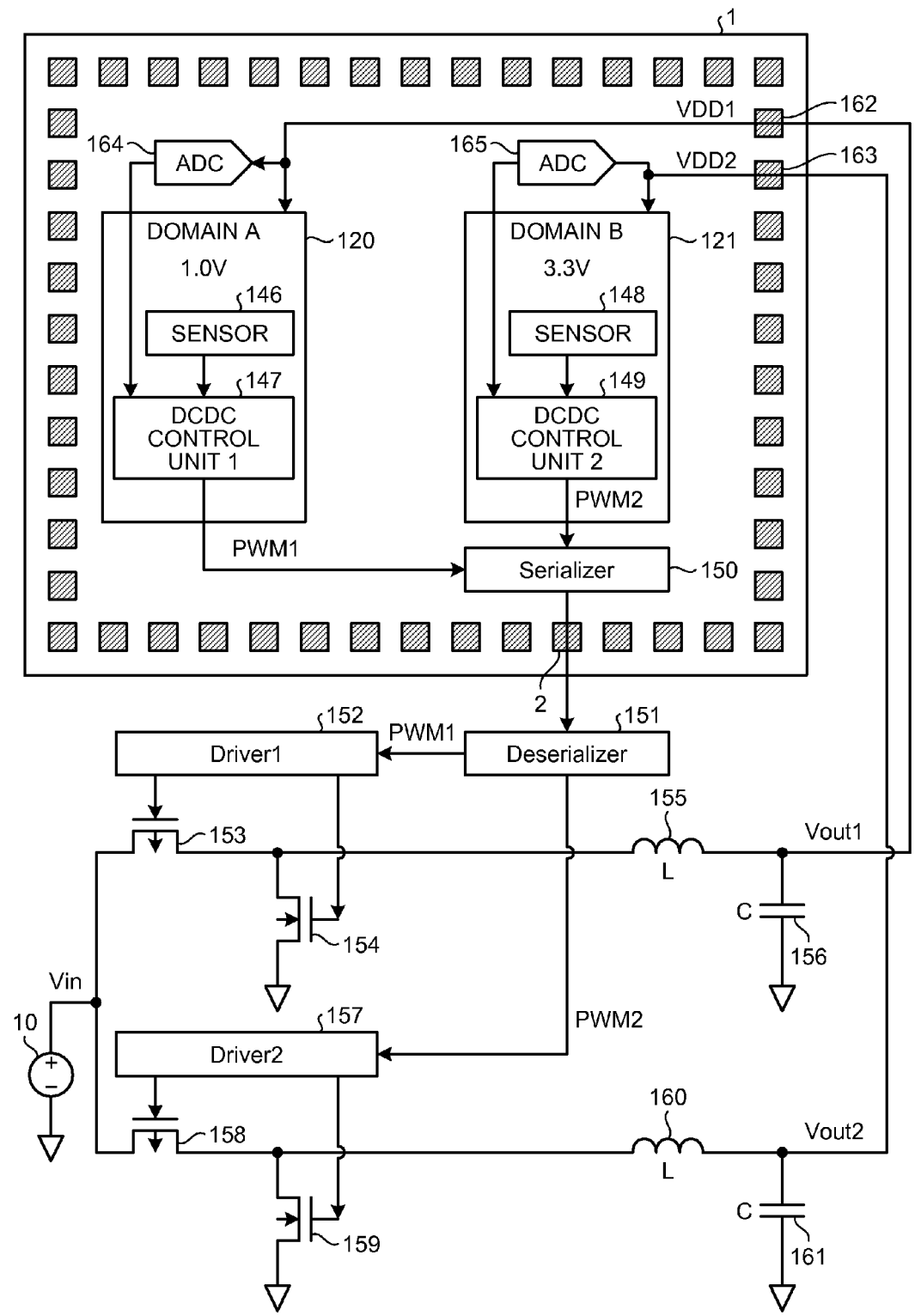
FIG. 12 is a diagram illustrating the structure of a semiconductor device according to a tenth embodiment.

FIG. 12 is a diagram illustrating the structure of a semiconductor device according to a tenth embodiment. The same components as those in the first to ninth embodiments are denoted by the same reference numerals and the description thereof will not be repeated. This embodiment relates to a so-called multi-channel structure in which different power supply voltages are supplied to each power domain formed in a semiconductor chip 1. In this embodiment, the semiconductor chip 1 includes two power domains 120 and 121. A voltage of 1.0 V is supplied as a power supply voltage VDD1 to the power domain 120 through an electrode pad 162. A voltage of 3.3 V is supplied as a power supply voltage VDD2 the power domain 121 through an electrode pad 163. The power domains 120 and 121 include sensors 146 and 148, respectively, and the outputs from the sensors 146 and 148 are supplied to DCDC control units 147 and 149. An AD converter 164 converts information about the power supply voltage VDD1 into a digital value and the digital value is supplied to the DCDC control unit 147 of the power domain 120. An AD converter 165 converts information about the power supply voltage VDD2 into a digital value and the digital value is supplied to the DCDC control unit 149 of the power domain 121.

The DCDC control units 147 and 149 perform control corresponding to the above-mentioned various control modes. The outputs from the DCDC control units 147 and 149 are supplied to a serializer 150 and are then converted into parallel signals by a deserializer 151 which is provided outside the semiconductor chip 1. Then, the parallel signals are supplied to drivers 152 and 157. The serial-parallel conversion by the serializer 150 and the deserializer 151 makes it possible to output two PWM signals PWM1 and PWM2 from one electrode pad 2 of the semiconductor chip 1 to the drivers 152 and 157, respectively. The serializer 150 may be, for example, an EOR circuit (not illustrated). The deserializer 151 may be a two-stage T-type flip-flop circuit in which a signal is directly supplied to one stage and an inverted signal is supplied to the other stage.

The first driver 152 controls an output voltage Vout1 from a first power circuit including a PMOS switching transistor 153, an NMOS switching transistor 154, an inductor 155, and a capacitor 156. The second driver 157 controls an output voltage Vout2 from a second power circuit including a PMOS switching transistor 158, an NMOS switching transistor 159, an inductor 160, and a capacitor 161. The first output voltage Vout1 and the second output voltage Vout2 are supplied to the electrode pads 162 and 163 of the semiconductor chip 1, respectively. The controlled power supply voltages VDD1 and VDD2 are supplied to the two power domains 120 and 121 through the electrode pads 162 and 163, respectively.

According to this embodiment, the power supply voltages VDD1 and VDD2 of the semiconductor device with a multi-channel structure can be controlled in various control modes and then supplied to the power domains 120 and 121, respectively. The DCDC control units 147 and 149 formed in the semiconductor chip 1 in which the power domains 120 and 121 are formed can rapidly control the power supply voltages VDD1 and VDD2 corresponding to the characteristics or operation state of the power domains 120 and 121 and supply the controlled power supply voltages VDD1 and VDD2 to the power domains 120 and 121, respectively. The use of the serializer 150 and the deserializer 151 makes it possible to output two PWM signals PWM1 and PWM2 for controlling the drivers 152 and 157 of two power circuits from the common electrode pad 2 of the semiconductor chip 1. Therefore, it is possible to prevent an increase in the number of electrode pads. However, the outputs from the DCDC control units 147 and 149 may be directly supplied from two electrode pads to the drivers 152 and 157, respectively.

Figure 13:
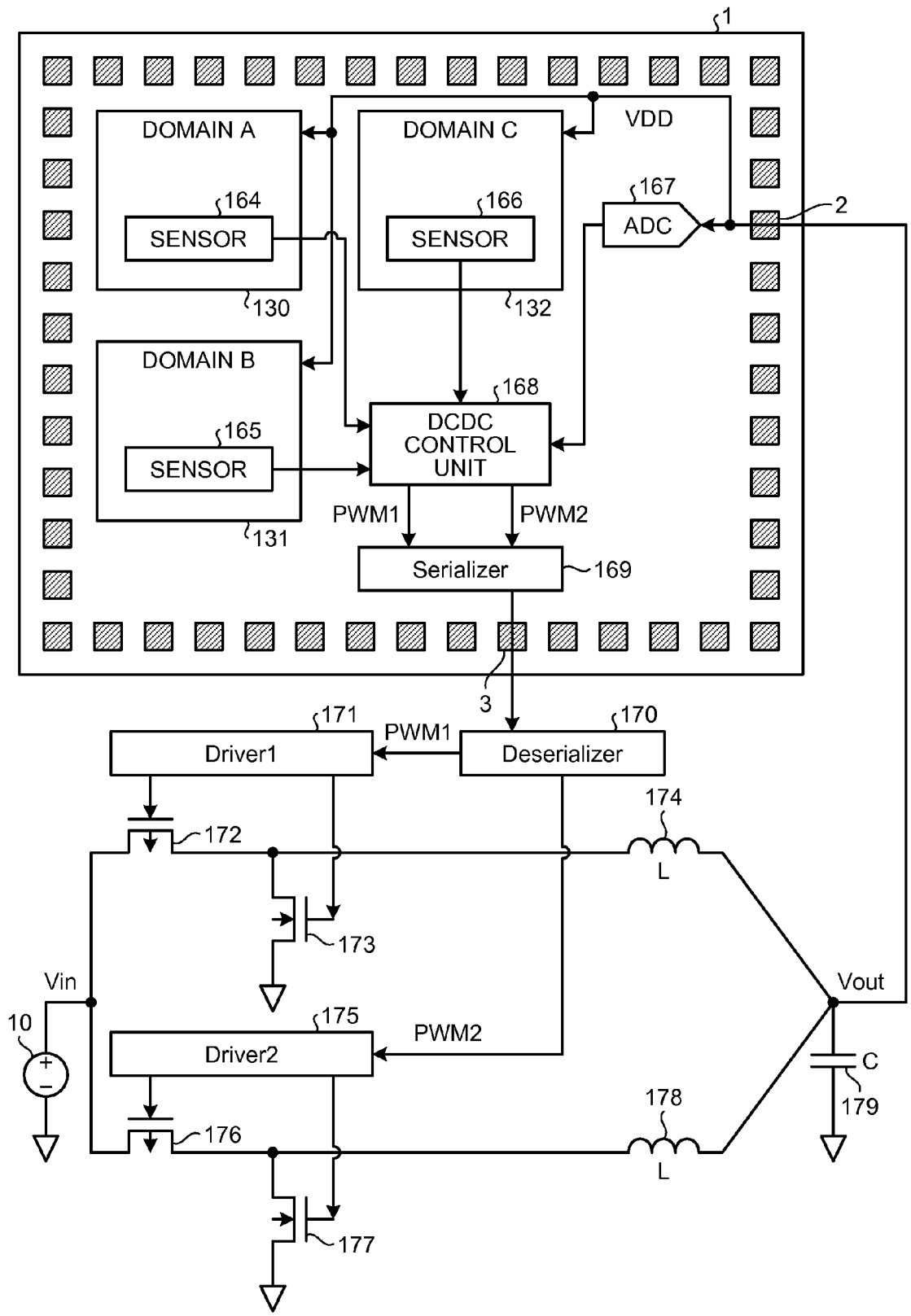
FIG. 13 is a diagram illustrating the structure of a semiconductor device according to an eleventh embodiment.

FIG. 13 is a diagram illustrating the structure of a semiconductor device according to an eleventh embodiment. The same components as those in the first to tenth embodiments are denoted by the same reference numerals and the description thereof will not be repeated. This embodiment relates to a multi-phase power supply structure. That is, the semiconductor device includes two sets of power circuits which operate in different phases. The first power circuit includes a PMOS switching transistor 172, an NMOS switching transistor 173, and an inductor 174. The second power circuit includes a PMOS switching transistor 176, an NMOS switching transistor 177, and an inductor 178. The inductor 174 and the inductor 178 are connected to a common capacitor 179 and the outputs from the first and second power circuits are added.

A semiconductor chip 1 includes power domains 130 to 132. The power domains 130 to 132 include sensors 164 to 166 which output predetermined information indicating, for example, the operation state of each power domain to a DCDC control unit 168, respectively. An AD converter 167 converts information about a power supply voltage VDD into a digital value and the digital value is supplied to the DCDC control unit 168. The DCDC control unit 168 outputs two PWM signals PWM1 and PWM2 on the basis of the predetermined information and the output from the DCDC control unit 168 is supplied to a serializer 169. A serial signal from the serializer 169 is supplied to a deserializer 170 through an electrode pad 3 and is then converted into parallel signals. The parallel signals are supplied to drivers 171 and 175 of the power circuits.

The DCDC control unit 168 formed in the semiconductor chip 1 rapidly controls two PWM signals PWM1 and PWM2 to desired output voltages on the basis of the predetermined information which is directly supplied from the sensors 164 to 166 and outputs the two PWM signals PWM1 and PWM2. The two PWM signals PWM1 and PWM2 are supplied to the serializer 169 and are then converted into a serial signal. Then, the serial signal is output from the electrode pad 3. The deserializer 170 converts the serial signal into the parallel signals and the parallel signals are supplied to the drivers 171 and 175 of the power circuits. The duty of the turning on and off of the switching transistors 172 and 173 of the first power circuit and the switching transistors 176 and 177 of the second power circuit is controlled and the output voltages from the first and second power circuits are added. Then, the added voltage is supplied to the electrode pad 2 of the semiconductor chip 1. Since the outputs from the first and second power circuits are added, it is possible to increase an output current. In addition, control is performed such that the time the PMOS switching transistor 172 of the first power circuit is turned on deviates from the time the PMOS transistor 176 of the second power circuit is turned on and the output voltage from the second power circuit is the maximum at the time the output voltage from the first power circuit is the minimum. In this way, it is possible to obtain a power supply voltage VDD whose ripple is suppressed. In addition, the number of power circuits may be further increased by the same structure as described above to increase the output current, thereby further reducing the ripple of the power supply voltage.

According to this embodiment, the DCDC control unit 168 formed in the semiconductor chip 1 can rapidly control the power supply voltage VDD such that it corresponds to a large current and the ripple thereof is reduced, on the basis of the operation state of each of the power domains 130 to 132 which are integrated into the semiconductor chip 1, and supply the power supply voltage VDD to the power domains 130 to 132 of the semiconductor chip 1.

Figure 14:
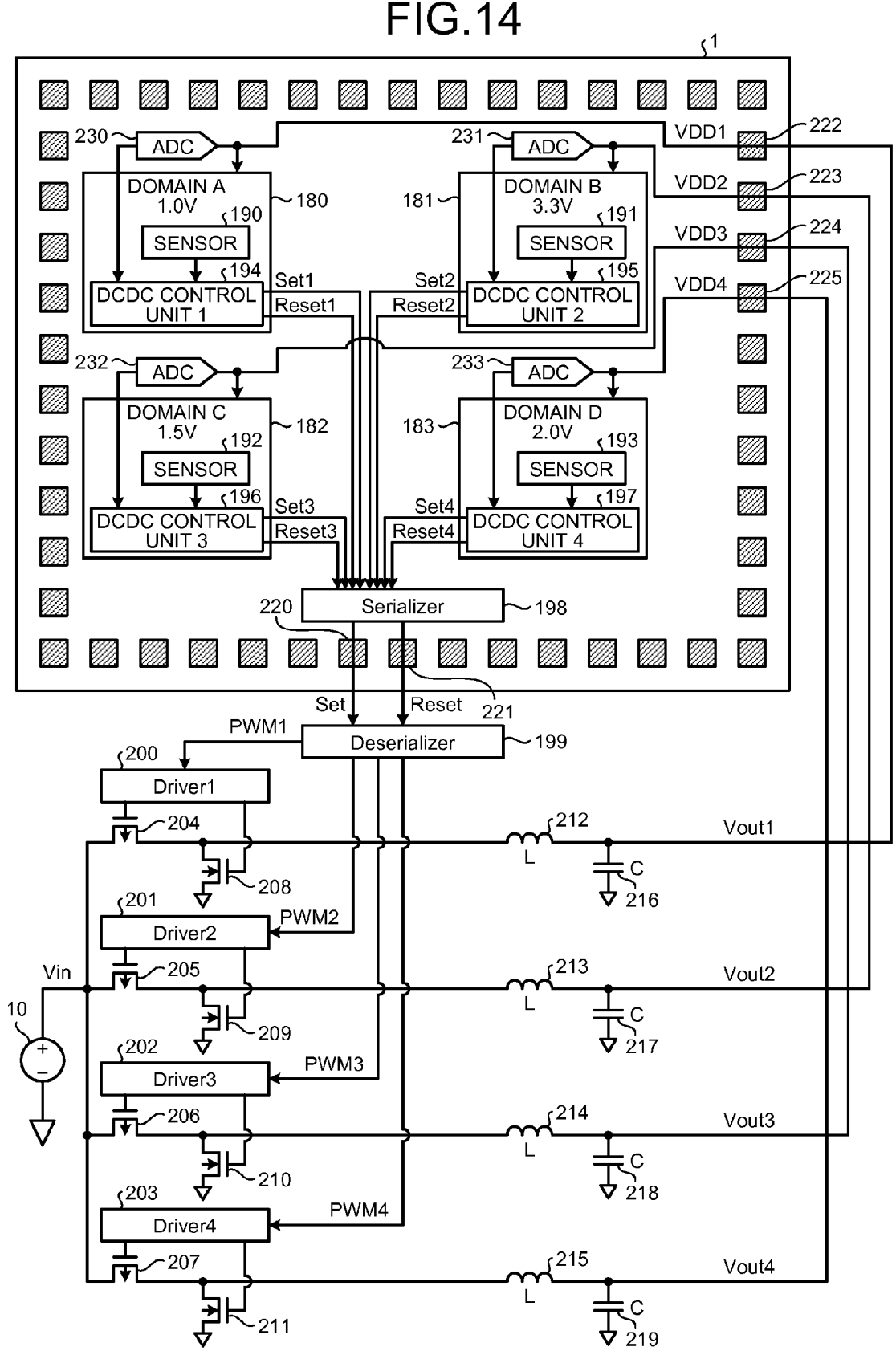
FIG. 14 is a diagram illustrating the structure of a semiconductor device according to a twelfth embodiment.

FIG. 14 is a diagram illustrating the structure of a semiconductor device according to a twelfth embodiment. The same components as those in the first to eleventh embodiments are denoted by the same reference numerals and the description thereof will not be repeated. This embodiment relates to a so-called multi-channel structure in which different power supply voltages are supplied to power domains formed in a semiconductor chip 1. In this embodiment, the semiconductor chip 1 includes four power domains 180 to 183. A voltage of 1.0 V is supplied as a power supply voltage VDD1 to the power domain 180 through an electrode pad 222. A voltage of 3.3 V is supplied as a power supply voltage VDD2 to the power domain 181 through an electrode pad 223. A voltage of 1.5 V is supplied as a power supply voltage VDD3 to the power domain 182 through an electrode pad 224. A voltage of 2.0 V is supplied as a power supply voltage VDD4 to the power domain 183 through an electrode pad 225.

The power domains 180 to 183 include sensors 190 to 193, respectively. The outputs from the sensors 190 to 193 are supplied to DCDC control units 194 to 197 provided in the power domains 180 to 183, respectively. An AD converter 230 converts information about the power supply voltage VDD1 into a digital value and the digital value is supplied to the DCDC control unit 194 of the power domain 180. An AD converter 231 converts information about the power supply voltage VDD2 into a digital value and the digital value is supplied to the DCDC control unit 195 of the power domain 181. An AD converter 232 converts information about the power supply voltage VDD3 into a digital value and the digital value is supplied to the DCDC control unit 196 of the power domain 182. An AD converter 233 converts information about the power supply voltage VDD4 into a digital value and the digital value is supplied to the DCDC control unit 197 of the power domain 183.

Each of the DCDC control units 194 to 197 performs control in the above-mentioned various control modes. Outputs Set1 to Set4 and Reset1 to Reset4 from the DCDC control units 194 to 197 are supplied to a serializer 198 and are then converted into a serial signal. The set signals Set1 to Set4 correspond to the set signals in the above-described embodiments. For example, the set signals Set1 to Set4 correspond to the set signal which is supplied from the frequency/phase adjustment circuit 34 to the RS latch circuit 33 in the embodiment illustrated in FIG. 3. The reset signals Reset1 to Reset4 correspond to the reset signal Resetsignal which are supplied from the digital delay conversion circuit 32 to the RS latch circuit 33 in the example illustrated in FIG. 3. The outputs Set and Reset from the serializer 198 are supplied to a deserializer 199 through two electrode pads 220 and 221. The serializer 199 forms four PWM signals PWM1 to PWM4 and supplies the PWM signals PWM1 to PWM4 to drivers 200 to 203. An example of the serializer 198 and the deserializer 199 will be described below.

The first driver 200 controls an output voltage Vout1 from a first power circuit including a PMOS switching transistor 204, an NMOS switching transistor 208, an inductor 212, and a capacitor 216. The second driver 201 controls an output voltage Vout2 from a second power circuit including a PMOS switching transistor 205, an NMOS switching transistor 209, an inductor 213, and a capacitor 217. The third driver 202 controls an output voltage Vout3 from a third power circuit including a PMOS switching transistor 206, an NMOS switching transistor 210, an inductor 214, and a capacitor 218. The fourth driver 203 controls an output voltage Vout4 from a fourth power circuit including a PMOS switching transistor 207, an NMOS switching transistor 211, an inductor 215, and a capacitor 219. The power supply voltages VDD1 to VDD4 controlled by the DCDC control units 194 to 197 of the power domains 180 to 183 are supplied to the four power domains 180 to 183 through electrode pads 222 to 225, respectively.

According to this embodiment, the power supply voltages VDD1 to VDD4 of the semiconductor device with a multichannel structure can be controlled in various control modes and then supplied to the power domains 180 to 183, respectively. The DCDC control units 194 to 197 formed in the semiconductor chip 1 in which the power domains 180 to 183 are formed can rapidly control the power supply voltages VDD1 to VDD4 corresponding to the characteristics or operation state of the power domains 180 to 183 and supply the power supply voltages VDD1 to VDD4 to the power domains 180 to 183, respectively. The use of the serializer 198 and the deserializer 199 makes it possible to supply signals required to form the PWM signals PWM1 to PWM4 for controlling the drivers 200 to 203 of the four power circuits to the power circuits through the two electrode pads 220 and 221. Therefore, it is possible to prevent an increase in the number of electrode pads.

Figure 15A:
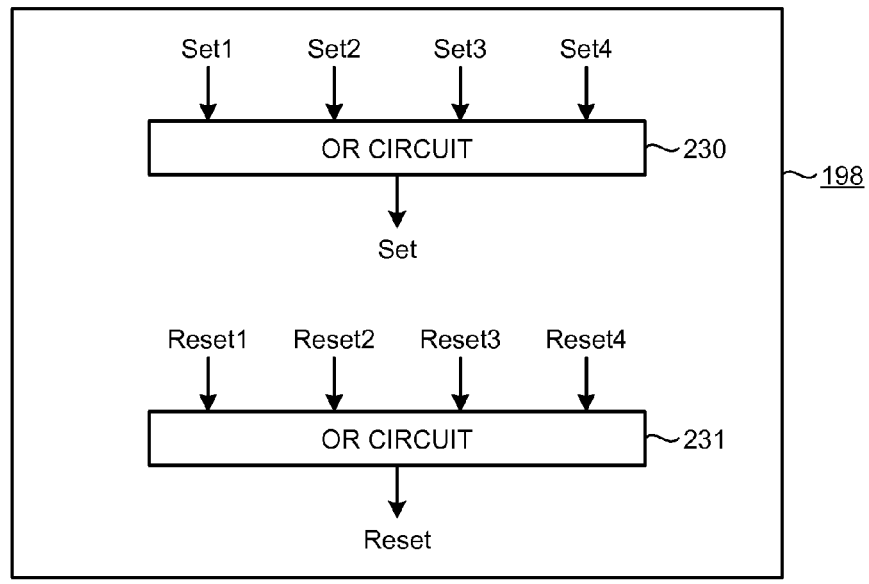
FIGS. 15A and 15B are diagrams illustrating examples of a serializer and a deserializer which can be used in the embodiment illustrated in FIG. 14.
Figure 15B:
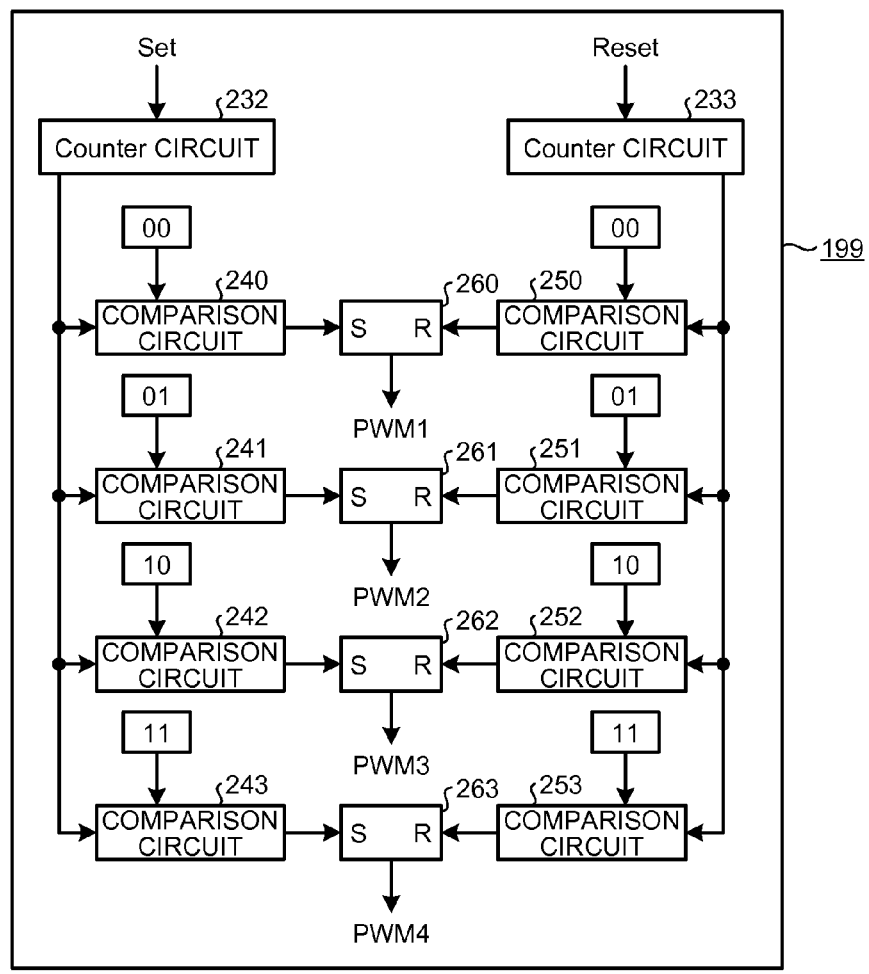

FIGS. 15A and 15B are diagrams illustrating examples of the serializer 198 and the deserializer 199 which can be used in the embodiment illustrated in FIG. 14. FIG. 15A illustrates an example of the serializer 198. The serializer 198 includes two OR circuits 230 and 231. The set signals Set1 to Set4 are supplied to the OR circuit 230. The set signal Set and the reset signal Reset, which are the outputs from the serializer 198, are supplied to the deserializer 199 through the pads 220 and 221 of the semiconductor chip.

FIG. 15B illustrates an example of the deserializer 199. The deserializer 199 includes two counter circuits 232 and 233. The counter circuit 232 counts the set signal Set supplied from the serializer 198 and supplies the count result to comparison circuits 240 to 243. The counter circuit 233 counts the reset signal Reset supplied from the serializer 198 and supplies the count result to comparison circuits 250 to 253. The comparison circuits 240 to 243 each have unique digital values 00 to 11. When the count result from the counter circuit 232 is equal to the digital values, each comparison circuit outputs a pulse signal (not illustrated) to the set input terminals S of the corresponding RS latch circuits 260 to 263. Similarly, the comparison circuits 250 to 253 each have unique digital values 00 to 11. When the count result from the counter circuit 233 is equal to the digital values, each comparison circuit outputs a pulse signal (not illustrated) to the reset input terminals R of the corresponding RS latch circuits 260 to 263. The RS latch circuits 260 to 263 output four PWM signals PWM1 to PWM4 whose rising and falling have been controlled by the set signal and the reset signal. The PWM signals PWM1 to PWM4 are supplied to the drivers 200 to 203 of the corresponding power circuits, respectively.

Figure 16:
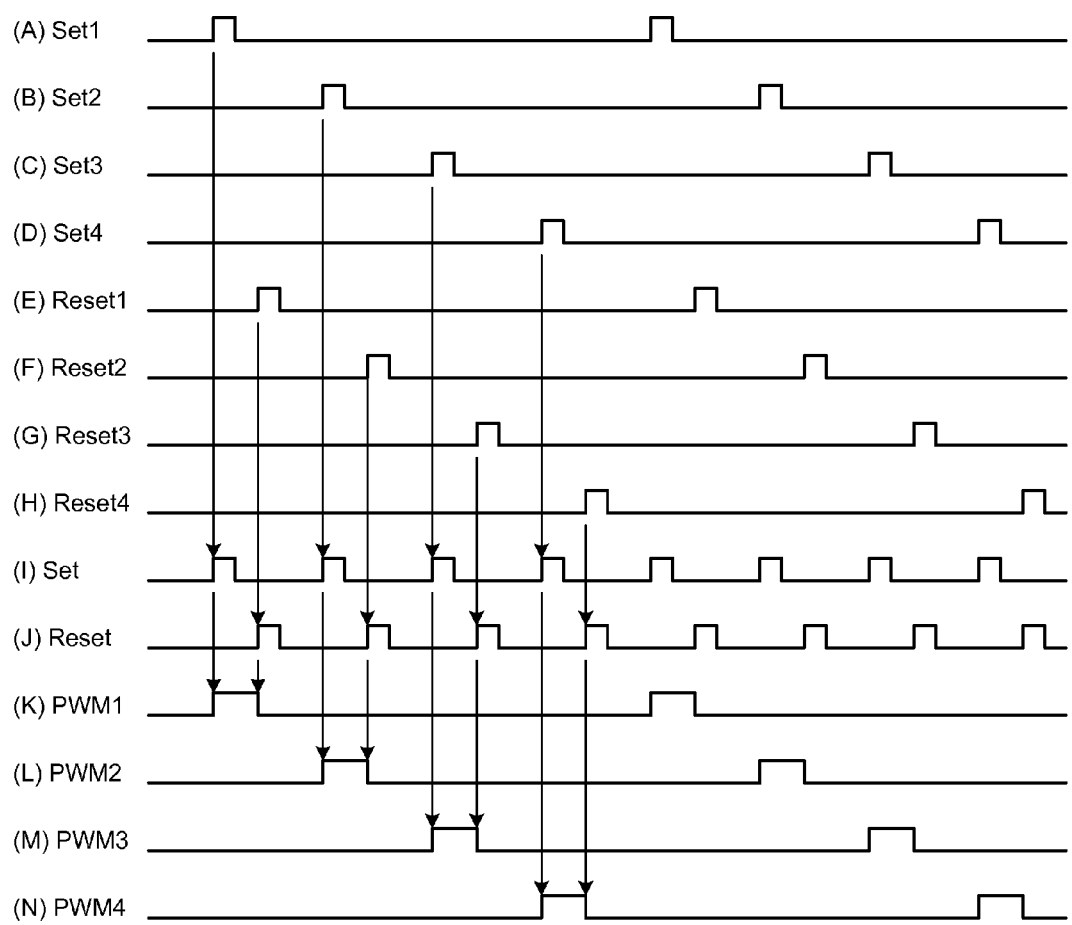
FIGS. 16A to 16N are diagrams illustrating the relationship between signals supplied to a serializer and a deserializer in the embodiment illustrated in FIG. 14 and signals output therefrom.

FIGS. 16A to 16N are diagrams illustrating the relationship between the signals supplied to the serializer 198 and the deserializer 199 and the signals output therefrom. FIGS. 16A to 16D illustrate the set signals Set1 to Set4 supplied to the serializer 198. FIGS. 16E to 16H illustrate the reset signals Reset1 to Reset4 supplied to the serializer 198. FIG. 16I illustrates an output signal Setsignal from the OR circuit 230 of the serializer 198. The sets signal Set1 to Set4 supplied to the OR circuit 230 of the serializer 198 are converted into a serial signal Set. FIG. 16J illustrates an output signal Resetsignal from the OR circuit 231 of the serializer 198. The reset signals Reset1 to Reset4 supplied to the OR circuit 231 of the serializer 198 are converted into a serial signal Reset. FIGS. 16K to 16N illustrate the PWM signals PWM1 to PWM4 which are the output signals from the deserializer 199. The rising and falling of the PWM signals PWM1 to PWM4, which are the output signals from the deserializer 199, are controlled by the corresponding set signals Set1 to Set4 and the corresponding reset signals Reset1 to Reset4. The RS latch circuits 260 to 263 respond to the set signals Set1 to Set4 and the reset signals Reset1 to Reset4 corresponding to the comparison circuits 240 to 243 and the comparison circuits 250 to 253 in the deserializer 199 and output the PWM signals PWM1 to PWM4 as the parallel signals. The PWM signals PWM1 to PWM4 are supplied to the drivers 200 to 203 of the power circuits, respectively.

The set signals Set1 to Set4 and the reset signals Reset1 to Reset4 are the control signals which are supplied from the control circuit units 194 to 197 provided in the power domains 180 to 183 in the embodiment illustrated in FIG. 14. Therefore, the power supply voltages VDD1 to VDD4 can be controlled on the basis of the state of each of the power domains 180 to 183. In addition, even when the number of power domains provided in the semiconductor chip 1 increases, it is possible to increase the number of comparison circuits and RS latch circuits in the deserializer 199 so as to correspond to the number of power domains formed in the semiconductor chip 1, thereby responding to the increase in the number of power domains. In this case, two signals, that is, the set signal Set and the reset signal Reset can be output from the serializer 198. Therefore, two power supply pads may be provided in the semiconductor chip in order to supply signals from the serializer 198 to the deserializer 199. In the multi-phase structure according to the embodiment illustrated in FIG. 13, even when the number of power circuits increases, it is possible to use the same serializer 198 and deserializer 199 as those in the structure illustrated in FIG. 15.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A semiconductor device comprising:
a first semiconductor chip which includes a first power supply terminal and into which a circuit block operated by a power supply voltage supplied to the first power supply terminal is integrated;
a power circuit that includes a first switching transistor and supplies the power supply voltage to the first power supply terminal; and
a control circuit that is formed on the first semiconductor chip and generates a control signal for controlling the turning on and off of the first switching transistor in response to an information signal from the circuit block and a voltage information signal corresponding to the power supply voltage, wherein the control circuit includes:
a voltage error signal generation circuit that compares the power supply voltage with a predetermined reference voltage and generates a first control signal on the basis of the comparison result;
a frequency error signal generation circuit that compares the operating frequency and phase of the circuit block with the frequency and phase of the power circuit and generates a second control signal on the basis of the comparison result; and
a circuit that generates a signal for controlling the ratio of the turning on and off of the first switching transistor of the power circuit in response to the first control signal and the second control signal.

2. The semiconductor device according to claim 1, wherein the power circuit further includes a second switching transistor, and
the control signal generated by the control circuit is used to control the ratio of the turning on and off of the first and the second switching transistors.

3. The semiconductor device according to claim 2, wherein the information signal includes a signal indicating the operating frequency and phase of the circuit block, and
the control circuit generates a signal for controlling the first and the second switching transistors of the power circuit such that the first and the second switching transistors are turned on and off at a frequency and/or a phase different from the operating frequency and/or phase of the circuit block.

4. The semiconductor device according to claim 3, wherein the control circuit includes:
a voltage error signal generation circuit that compares the power supply voltage with a predetermined reference voltage and generates a first control signal on the basis of the comparison result;
a frequency error signal generation circuit that compares the operating frequency and phase of the circuit block with the frequency and phase of the power circuit and generates a second control signal on the basis of the comparison result; and
a circuit that generates a signal for controlling the ratio of the turning on and off of the first and the second switching transistors of the power circuit in response to the first control signal and the second control signal.

5. The semiconductor device according to claim 1, wherein the information signal includes a signal indicating the operating frequency and phase of the circuit block, and
the control circuit generates a signal for controlling the first switching transistor of the power circuit such that the first switching transistor is turned on and off at a frequency and/or a phase different from the operating frequency and/or phase of the circuit block.

6. A semiconductor device comprising:
a first semiconductor chip which includes a first power supply terminal and into which a circuit block operated by a power supply voltage supplied to the first power supply terminal is integrated;
a power circuit that includes a switching transistor and supplies the power supply voltage to the first power supply terminal; and
a control circuit that is formed on the first semiconductor chip and generates a control signal for controlling the turning on and off of the switching transistor in response to an information signal from the circuit block and a voltage information signal corresponding to the power supply voltage, wherein the information signal includes a signal indicating temperature information of the circuit block, and
the control circuit generates a signal for controlling the ratio of the turning on and off of the switching transistor of the power circuit on the basis of the information signal indicating the temperature information; and
wherein the control circuit includes:
a first error calculation circuit that compares a predetermined reference voltage with the power supply voltage and calculates a first error signal;
a second error calculation circuit that compares a predetermined reference temperature signal with the temperature information of the circuit block and calculates a second error signal;
a third error calculation circuit that compares a predetermined reference delay signal with information about a delay in the operation of the circuit block and calculates a third error signal; and
an adder circuit that adds outputs from the first to third error calculation circuits.

7. A semiconductor device comprising:
a first semiconductor chip which includes a first power supply terminal and into which a circuit block operated by a power supply voltage supplied to the first power supply terminal is integrated;
a power circuit that includes a switching transistor and supplies the power supply voltage to the first power supply terminal; and
a control circuit that is formed on the first semiconductor chip and generates a control signal for controlling the turning on and off of the switching transistor in response to an information signal from the circuit block and a voltage information signal corresponding to the power supply voltage, wherein
the power circuit includes a first power circuit that outputs a first output voltage and a second power circuit that outputs a second output voltage, and
the control circuit generates a control signal for controlling the turning on and off of each of the first power circuit and the second power circuit, and
the semiconductor device further comprises:
a serializer that is formed in the semiconductor chip and converts the control signal of the control circuit into a serial signal; and
a deserializer that is provided outside the semiconductor chip, receives an output signal from the serializer, and converts the output signal from the serializer into parallel signals.

8. A semiconductor device comprising:
a first semiconductor chip which includes a first power supply terminal and into which a circuit block operated by a power supply voltage supplied to the first power supply terminal is integrated;
a power circuit that includes a switching transistor and supplies the power supply voltage to the first power supply terminal; and
a control circuit that is formed on the first semiconductor chip and generates a control signal for controlling the turning on and off of the switching transistor in response to an information signal from the circuit block and a voltage information signal corresponding to the power supply voltage, wherein the power circuit includes a first power circuit that outputs a first output voltage in a first phase and a second power circuit that outputs a second output voltage in a second phase different from the first phase, and the control circuit outputs control signals for controlling the first power circuit and the second power circuit, and a voltage obtained by adding an output voltage from the first power circuit and an output voltage from the second power circuit is supplied to the first power supply terminal, and the semiconductor device further comprises:

a serializer that is formed in the semiconductor chip and converts the control signal of the control circuit into a serial signal; and a deserializer that is provided outside the semiconductor chip, receives an output signal from the serializer, and converts the output signal from the serializer into parallel signals.

9. The semiconductor device according to claim 8, wherein the serializer includes an OR circuit to which a signal for controlling the rising of the control signal or a signal for controlling the falling of the control signal is supplied for controlling the turning on and off of the switching transistor, and the deserializer includes a counter circuit that responds to the output signal from the serializer, a comparison circuit that outputs a signal when a count value of the counter circuit is equal to a predetermined value, and an RS latch circuit that outputs a control signal whose rising and falling are controlled, in response to the output signal from the comparison circuit.

* * * * *